(12) United States Patent
Wei

(10) Patent No.: US 12,410,378 B2
(45) Date of Patent: Sep. 9, 2025

(54) METHODS OF MAKING POL YUREA POWDERS, GELS AND GREASES, AND RELATED COMPOSITIONS MADE THEREFROM

(71) Applicant: Liwen Wei, Tomball, TX (US)

(72) Inventor: Liwen Wei, Tomball, TX (US)

(73) Assignee: Novitas Chem Solutions, Houston, TX (US)

(*) Notice: Subject to any disclaimer, the term of this patent is extended or adjusted under 35 U.S.C. 154(b) by 17 days.

(21) Appl. No.: 18/006,303

(22) PCT Filed: Jul. 22, 2021

(86) PCT No.: PCT/US2021/042750
§ 371 (c)(1),
(2) Date: Jan. 20, 2023

(87) PCT Pub. No.: WO2022/020575
PCT Pub. Date: Jan. 27, 2022

(65) Prior Publication Data
US 2023/0295530 A1 Sep. 21, 2023

Related U.S. Application Data

(60) Provisional application No. 63/055,031, filed on Jul. 22, 2020.

(51) Int. Cl.
*C10M 169/02* (2006.01)
*C10M 105/06* (2006.01)
(Continued)

(52) U.S. Cl.
CPC ........ *C10M 169/02* (2013.01); *C10M 105/06* (2013.01); *C10M 115/08* (2013.01);
(Continued)

(58) Field of Classification Search
CPC ............. C10M 169/02; C10M 105/06; C10M 115/08; C10M 119/24; C10M 177/00;
(Continued)

(56) References Cited

U.S. PATENT DOCUMENTS

2006/0052261 A1* 3/2006 Kray .................... C10M 119/24
528/48
2012/0028859 A1 2/2012 Lee et al.

FOREIGN PATENT DOCUMENTS

WO 2007/087323 A2 8/2007

OTHER PUBLICATIONS

International Search Report dated Nov. 25, 2021, PCT/US2021/042750.

* cited by examiner

*Primary Examiner* — Cephia D Toomer
(74) *Attorney, Agent, or Firm* — Finnegan, Henderson, Farabow, Garrett & Dunner, LLP

(57) ABSTRACT

A food package comprising a container having a sealed top layer and comprising a fresh, preservative-free food product comprising chickpeas, such as hummus, which includes no preservatives and exhibits total yeast and mold counts of less than 10 CFU/g at 28 days after production when stored at 2° C. to 8° C. The package includes a headspace between the fresh hummus and the top sealing layer, the headspace comprising a modified atmosphere which is nitrogen rich, such as 70% $N_2$:30% $CO_2$.

29 Claims, 3 Drawing Sheets

(51) Int. Cl.
- *C10M 115/08* (2006.01)
- *C10M 119/24* (2006.01)
- *C10M 177/00* (2006.01)
- *C10N 20/06* (2006.01)
- *C10N 50/10* (2006.01)
- *C10N 70/00* (2006.01)

(52) U.S. Cl.
CPC ........ *C10M 119/24* (2013.01); *C10M 177/00* (2013.01); *C10M 2203/065* (2013.01); *C10M 2215/1026* (2013.01); *C10M 2217/0456* (2013.01); *C10N 2020/06* (2013.01); *C10N 2050/10* (2013.01); *C10N 2070/00* (2013.01)

(58) Field of Classification Search
CPC .... C10M 2203/065; C10M 2215/1026; C10M 2217/0456; C10M 2203/1006; C10M 2203/1025; C10M 2203/1065; C10M 2205/0285; C10M 2205/223; C10M 171/06; C10N 2020/06; C10N 2050/10; C10N 2070/00; C10N 2070/02; B29B 7/7636

See application file for complete search history.

METHODS OF MAKING POLYUREA POWDERS, GELS AND GREASES, AND RELATED COMPOSITIONS MADE THEREFROM

CROSS-REFERENCE TO RELATED APPLICATIONS

This application claims the benefit of priority to Provisional Application No. 63/055,031, filed Jul. 22, 2020, the entire contents of which are expressly incorporated herein by reference.

TECHNICAL FIELD

The present disclosure relates generally to a method of making polyurea containing powders by reacting isocyanates with amines through an ultrahigh pressure mixing and sizing process. Methods of making gels from such powders using a continuous shear driven process and polyurea greases with excellent mechanical stability and high temperature characteristics are also disclosed.

BACKGROUND

Polyurea grease has gained widespread attention for its high temperature stability and low noise characteristics attributed to its unique organic type of thickener as compared to traditional metal-based soap grease such as lithium-based grease. Lithium based grease currently has more than 70% of grease market share, however, is under threat due to the rapid growth of electric vehicles that is expected to tighten the lithium supply. Polyurea grease despite its potential to replace lithium grease, on the other hand, is facing the challenges and difficulties in its manufacturing that is traditionally made in situ at high temperature often in excess of 200° C. by reacting isocyanates such as MDI and TDI with amines in the presence of base oils.

The pre-form thickener approach by first forming polyurea thickener and then reacting the said thickener with base oils to achieve the polyurea grease is highly attractive to many as it takes away the difficulties in managing the toxic and hazardous nature of the isocyanate and amine raw materials. The first prior art disclosed a continuous reaction screw (U.S. Pat. No. 5,314,982 A) has failed to yield the thickener that is able to achieve desired grease matters with consistency and workability.

WO2020006234A1 employs high shear continuous mixer through in-situ mixing of isocyanates and amines and the use of liquid to produce master batch and subsequent recovery of dry powder with broad particle size distribution.

The spray drying at moderate pressure (U.S. Publication No.: US2006/0052261A1) employed a large excess of solvent that deems to be impractical for commercial operation and the recovered dry powder, (poly)urea particles to the total weight of the solvents of from 10:100 to 80:100. This and other solvent based prior art compositions do not define the particle size distribution that has direct impact to the structural stability of the grease.

U.S. Pat. No. 7,923,421 disclosed an encapsulated approach wherein the powder was made via high pressure impingement device. Clogging in the impingement device was noted in the absence of liquid diluent. However, in the presence of diluent oils, the powder resulted in porous and sponge like powder, and again with broad particle size distribution.

The presence of liquid diluent, such as solvent and base oils, limits its practicability for large scale and broad commercial production. Large particle size and broad distribution has direct and immediate impact to the subsequent grease making process and ultimate grease product performance resulting in lower thickener yield and reduced high temperature and structural stabilities. The foregoing highlights the difficulties and challenges in the making of polyurea preform thickener.

There is a need for a non-metallic grease with soap like structures, that exhibits high temperature stability, low noise characteristic, good mechanical and oxidation properties and high-shear stability. Accordingly, one object of this invention is to develop a commercial viable and energy saving process in the making a novel preform polyurea thickener composition with well-defined particle sizes characteristics unique in the art and with the consistency and reliability/performance not previously attainable.

SUMMARY

In view of the foregoing and to overcome the problems associated with the prior art, there is described a method of making a urea containing powder that comprises injecting at least one liquid amine and at least one liquid isocyanate simultaneously into a mixing chamber. The mixture chamber comprises at least one high pressure impingement mixing device, which is used to mix the amine and isocyanate at a high pressure, such as at least 2500 psi for a time to form a first urea containing powder with substantially no unreacted isocyanates. Mixing time of mixing in the impingement device is typically less than 10 seconds such as 0 to 5 seconds, and results in a powder having an average particle size (D50) represented as D1, and molecular weight distribution (D90-D50) represented as DD1.

In an embodiment, the method further comprises feeding the first urea containing powder into a sizing device to form a second urea containing powder with an average particle size (D50) represented as D2, wherein D2 is less than D1, and molecular weight distribution (D90-D50) represented as DD2, wherein DD2 is less than DD1.

The described method produces a urea containing powder composition with a stoichiometric mole ratio of isocyanates and amine functionalities.

In one embodiment, the method described herein further comprises at least one shear thickening step to form a thickened polyurea containing master batch. In this embodiment, the shear thickening step comprises a continuous shear driven process that includes mixing dry powder comprising the urea containing powder with at least one base oil, wherein the dry powder and base oil are mixed in a weight ratio ranging from 5/95 to 95/5.

In yet another embodiment, the method described herein further comprises forming a polyurea grease by gelling under heat, such as a temperature ranges from 100° C. to 180° C. for the first or second urea containing powder, or from ambient to 160° C. for the urea containing master batch, in the presence of an oil to form a gelled product and milling the gelled product to produce a polyurea grease with a smooth consistency and texture. The resulting grease has been shown to have excellent heat stability, as evidenced by a dropping point at least 250° C.

Aside from the subject matter discussed above, the present disclosure includes a number of other features such as those explained hereinafter. Both the foregoing description and the following description are exemplary only.

BRIEF DESCRIPTION OF THE DRAWINGS

The accompanying figures are incorporated in and constitute a part of this specification.

DETAILED DESCRIPTION

Definitions

Figure 1:
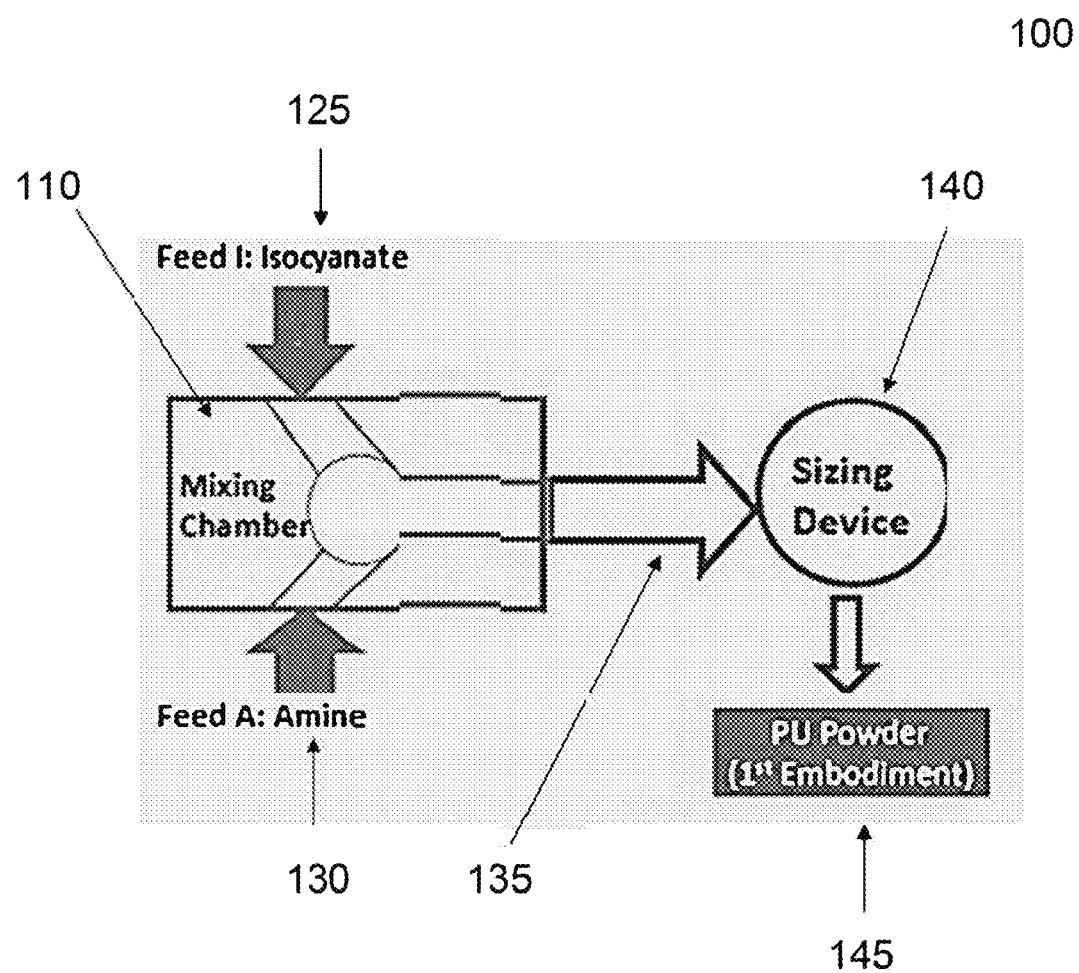
FIG. 1 is a schematic showing a system and method related to an embodiment for the making urea containing dry powder according to the present disclosure.

As used herein, an "impingement device" also known as an "impingement mixer" refers to a mixing device which causes high velocity streams of multiple liquids to impinge in a small chamber. The impinging jet configuration typically causes turbulent flow which mixes the precursors, i.e., amine and isocyanate liquids, as they flow out of the chamber.

As used herein, the term "dropping point" of a grease is an indication of the heat resistance of the grease and is the temperature at which it passes from a semi-solid to a liquid state under specific test conditions. It is dependent on the type of thickener used and the cohesiveness of the oil and thickener of a grease.

As used here in, "gel or gelling" or any version thereof, means the formation of thicken material between the base oils with the first and second urea containing powders.

As used herein, "high temperature stability" means having a dropping point of at least 250° C., such as at least 260° C., and even at least 290° C.

As used herein, "structural stability" means having an NLG grease grade change from 60 strokes to 100,000 strokes to less than one NLGI grade, a worked penetration ($P_W$) number of less than 15.

As used herein, "base oil (Group I, II, III, IV and V)" refers to without limitation, naphthenic oils, synthetic naphthenic oils such as alkyl benzene, diphenyl either, biphenyl, and alkylated naphthalene. These oils are preferred due to their inherent high stability and solvency resulting in higher grease yield (less thickener dosage).

As used herein, the phrase, "super fine," such as used to describe a polyurea thickener powder, means a D50 size, determined via laser light scattering, ranging from 0.1-200 micron, such as 0.1-100 micron, even 0.1-50 micron, and particle size distribution (D90-D50) to 100 micron, such as 50 micron, or even 25 micron.

As used herein, "smooth consistency" means free of discernible or measurable lumps or other irregularities.

As used herein, "residence time" means the time the amines and isocyanate spend in the mixing chamber prior to exiting the chamber.

As used herein, "ultra-high pressure", as used with regard to the mixing chamber(s) and device(s) herein, means a pressure more than 2,000 psi, such as more than 2,500 psi, more than 3,000 psi, and up to 7,000 psi. Ranges for these specific endpoints are also included within this definition, such as a pressure ranging from 2,500 psi to 7,000 psi, and any range in between.

As used herein, the "NLGI consistency number" (sometimes called "NLGI grade") expresses a measure of the relative hardness of a grease used for lubrication, as specified by the standard classification of lubricating grease established by the National Lubricating Grease Institute (NLGI). NLGI numbers range from 000-6 and reflect an increased hardness with increasing numbers. For example, an NLGI number of 000 defines a semi-fluid while a grease having an NLGI number of 6 is very hard. A grease having an NLGI number of 2 is considered a "normal" grease while a grease having an NLGI number of 4 is considered very firm.

As used herein, "penetration" is the depth measured in tens of millimeter when a cone of a specific weight into the grease according to ASTM D217.

As used herein, "Delta P100,000" is the worked penetration (Pw) number change from 60 strokes to 100,000 strokes.

Disclosed herein is a novel process of making urea containing powder(s), also referred to herein as a "polyurea grease thickener composition" in pure and super fine powder form. In one embodiment, the urea containing powder described herein can be made in the absence of any solvent or base oils. It also can be made using negligible amounts of solvents or base oils. In both cases, the disclosed powder has well-defined particle size that effectively yields a polyurea grease with consistency and workability, as well as excellent high temperature and structural stability. The disclosed urea containing powders achieve the performance required for the grease by incorporating, without limitation, all necessary components such as various base oils and additives known to the industry.

Thus, according to a first embodiment described herein, and with reference to FIG. 1, a ultra-high pressure mixing device 100 simultaneously receives at least one amine (130—Feed A) and at least one isocyanate (125—Feed I) under ultra-pressure. In an embodiment, feeds A (130) and I (125) are supplied to the mixing chamber via fixed or variable pumps to deliver stoichiometric equivalence to ensure complete formation of urea functionalities. These feeds are typically in liquid form and introduced into a mixing chamber 110 comprising one or multiple impingement devices at a temperature ranging from ambient to 120° C., such as from 50 to 100° C. that are sufficient to maintain the feeds in liquid form and a back pressure more than 2,000 psi, such as at least 2,500 psi, or 3,000 psi, up to 7,000 psi.

In one embodiment, the impingement devices described and used herein have a pore size, dimension, and geometry from flat to textured, necessary to achieve a residence time less than 10 seconds, such as less than 5 seconds or even less than 3 seconds. In another embodiment, the residence time is further determined by the feed temperature as well as the ultra high pressure applied to the impingement devices. The resulting urea containing powder is formed in the mixing chamber having a first particle size D1 (D50, determined via laser light scattering) and particle size distribution DD1 (D90-D50), which is subsequently fed 135 to a sizing (milling/grinding) device 140 that yields the powder 145 with an even narrower and well defined average particle size D2 (D50, determined via laser light scattering) within 0.1-200 micron, such as 0.1-100 micron, even 0.1-50 micron and particle size distribution (D90-D50) to 100 micron, such as 50 micron, or even to 25 micron. As mentioned, in various embodiments, the urea containing powder described herein can be made in the absence of any solvent or base oils, can be made using negligible amounts of solvents or base oils, or can be made using a predefined amount of base oil(s) or solvent(s).

According to a second embodiment disclosed herein, and with reference to FIG. 2, there is disclosed a continuous shear driven process 200, for instance but without limitation, a shear driven device 210, such as a twin screw extruder by co-feeding a polyurea ("PU") thickener powder, as made according to the first embodiment, such as described with reference to FIG. 1, and at least one solvent or base oil. In one embodiment, the powder made according to the first embodiment is continuously feed into a shear driven device 210. In this second embodiment, the polyurea powder is mixed with appropriate base oils in a weight ratio from 5/95 to 95/5 to form a thickened polyurea master batch 220. The thickened polyurea master batch 220 can be made into various forms, including but not limited to noodles, pallets, or in paste forms with average particle size (D50) within 0.1-200 micron, such as 0.1-100 micron, or even 0.1-50 micron.

Figure 3:
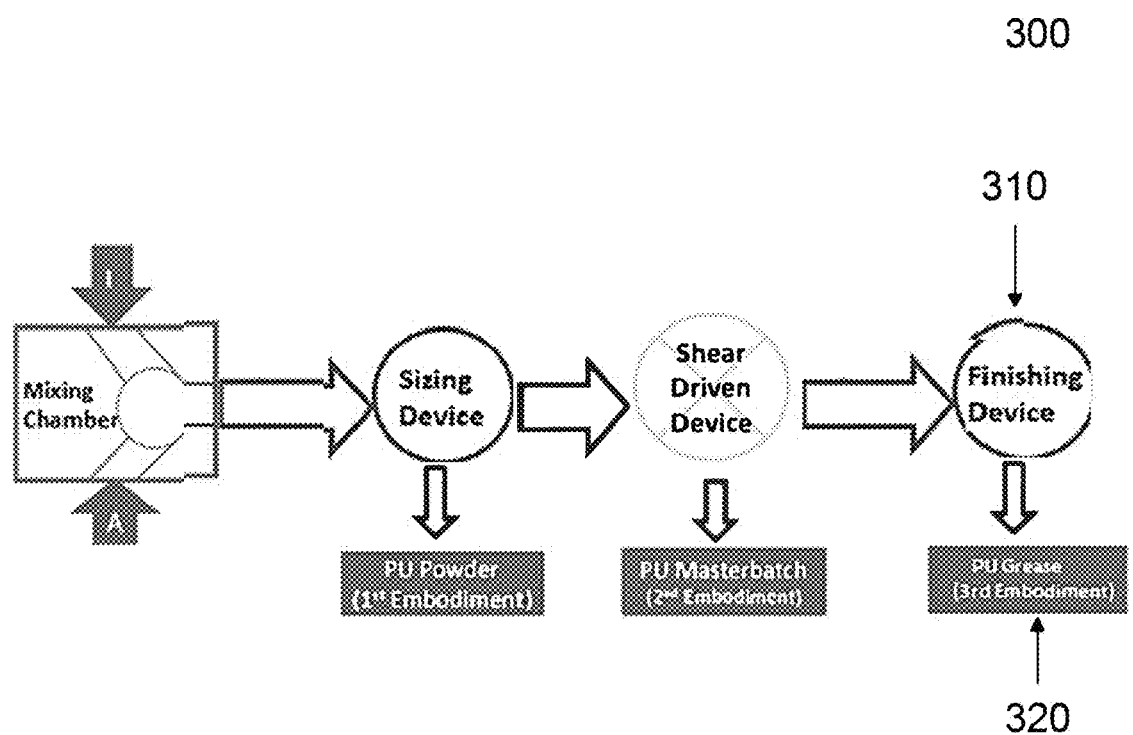
FIG. 3 is a schematic showing a system and method related to an embodiment for the making urea containing grease according to the present disclosure.

According to the third embodiment disclosed herein, and with reference to FIG. 3, a polyurea master batch made via the second embodiment 220 is further treated with at least one finishing device 310, such as an appropriate mixing/grinding devices including, but not limited to, high speed mixer, pin, or ball mills, or any other appropriate devices such as homogenizer known to the art to produce a polyurea grease 320. The method described herein to make the polyurea grease is performed under thermal conditions that are substantially lower than known prior art methods, such as from ambient temperature up to 140° C., such as up to 120° C., or even up to 100° C.

In addition, the resulting polyurea grease 320 has a smooth fiber texture with excellent high temperature and structural stability. According to the various embodiments disclosed herein, polyurea grease has structural and thermal stability as evidenced by a dropping point up to 250° C. and above, such as from 260° C. and above, or even from 290° C.

Polyurea Containing Powder

As described herein, in one embodiment the method of making a polyurea containing powder includes injecting liquid amines (Feed A) and liquid isocyanate (Feed I), together referred to as "liquid precursors", under ultra-pressure and temperature conditions simultaneously into a mixing chamber comprising one or more impingement devices.

The temperature conditions are high enough to maintain liquid states for the feeds as the liquids are fed through one or more impingement devices and back pressure conditions are sufficiently high, such as more than 2,000 psi, more than 2,500 psi, such as 3,000 psi, up to 7,000 psi.

The overall residence time of the liquid precursors within the mixing chamber is determined, but not limited by the chamber design, pressure, and temperature. In various embodiment, the residence time is within 10 seconds, such as within 5 seconds, or even within 3 seconds, and in some cases instantaneous. Residence time also varies with the nature of the precursors, such as functionalities and molecular weight of isocyanate and amines used. For example, for certain aromatic isocyanates, such as methylene diphenyl diisocyanate (MDI) and aliphatic amines, the residence time is less than 15 seconds, less than 12 seconds, less than 10 seconds, less than 5 seconds, or even less than 3 seconds, or even shorter. Failures to control residence time could result in clogging wherein the introduction of solvent or oils would become necessary, thus fundamentally change the integrity/morphology/composition of the polyurea thickener from dry powder to paste or spongy/wet powders.

According to the present invention, the polyurea powder made after the ultra-high pressure mixing chamber can be used in the subsequent grease conversion. It is contemplated however, to further optimize the grease yield so it is highly desirable to be fed through the sizing chamber that results in well-defined average particle size (D50) within 0.1-200 micron, such as 0.1-100 micron, such as 0.1-50 micron and particle size distribution (D90-D50) to 100 micron, such as 50 micron, or even to 25 micron.

In one embodiment, the sizing device is carried out in continuous and batch process via size reduction techniques such as air or mechanical impact mills, including but not limited to, air classification, air jet, pin or ball mill or hammer/screen mill from ambient to temperature up to 160° C.

According to an aspect of the present disclosure, the polyurea thickener may be exemplified as isocyanates being methylene diphenyl diisocyanate (MDI) and toluene di-isocyanate (TDI), respectively as follows:

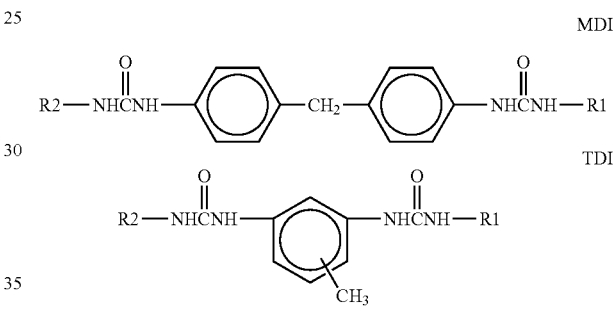

The amines (R1 and R2) represent chemicals with amine functionalities that are aliphatic, alicyclic, aromatic amines, primary or secondary, linear or branched, mono or diamine, alcohol or alkoxy containing amines, or other amine derivatives, and mixtures thereof.

Examples of such amines, without limitation, include fatty amine such as lauryl, stearyl, or tallow amines, cyclohexyl and dicyclohexyl amine, benzylamine, aniline, diamine such as ethylene diamine and alike, mono or polyetheramine such as Jeffamine M or D and the alike.

The chemistry and molar ratio of amines vary as desired to achieve the rheological and performance required by the grease. In one embodiment, as exemplified by a diurea composition where MDI and mono amines such as fatty amine and cycloalkyl amine are used, the molar ratio of which varies from 1/99 to 99/1. In others embodiments, amines such as mono and diamine or amines with other functionalities, The mixing chamber should be adjusted accordingly to accommodate the desired molar ratio of isocyanate (FIG. 1, 125—Feed I) to overall amines (FIG. 1, 130—Feed A) so the urea formation is fully achieved.

In another embodiment, alkanolamine such as ethanolamine or similar, or other functionalized amine that would allow a slight excess of isocyanates and provide alcohol functionalities to the resulting polyurea thickener can be used.

In yet another embodiment the selection of amine derivates and when a mixture of amine used, for instance, the aromatic amine is chosen over the aliphatic amine and the ratio of which will impact the resulting grease performance.

Isocyanates such as MDI (methylene diphenylene diisocyanate) and TDI (toluene di-isocyanate) are the two most popular choices in the grease industry. Others are certainly possible such as polymeric and isomeric MDI alternatives.

Polyurea Masterbatch

Figure 2:
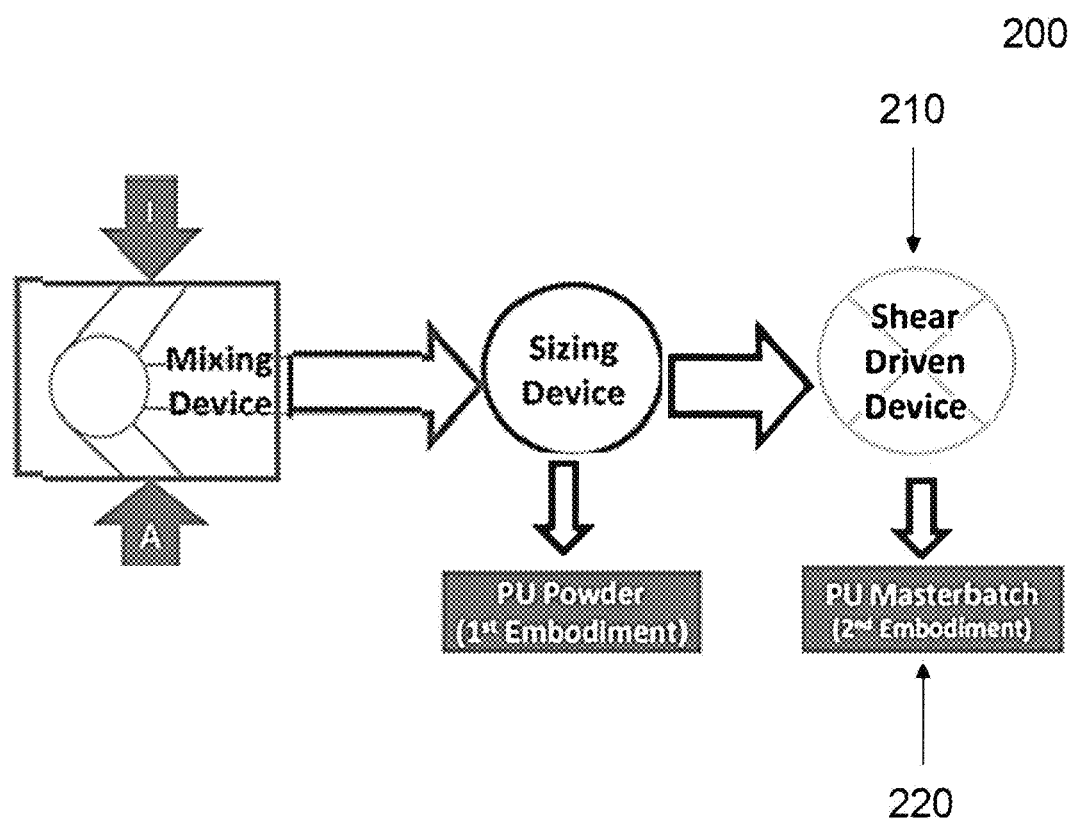
FIG. 2 is a schematic showing a system and method related to an embodiment for making urea containing master batch according to the present disclosure.

According to one aspect of the present disclosure, the polyurea thickener master batch shown in FIG. 2 is prepared using a continuous shear driven device, such as twin-screw extruder by co-feeding the super fine powder (from the first embodiment, FIG. 1) and the base oils of choice in a weight ratio from 5/95 to 95/5 through the twin screw extruder. The extruder used is designed to provide from mild to the maximum shear, and thus further control the thickener particle size. By controlling the through flow of the powder/base oil mixture through a close clearance between the screw and wall clearance, the operator has another variable to adjust and provide both maximum milling effect and resulting properties in the polyurea master batch. The resulting master batch can be in in noodles, pallets, or in paste forms with average particle size (D50) within 0.1-200 micron, such as 0.1-100 micron, or even 0.1-50 micron.

In one embodiment, the continuous shear driven device as described is able to provide the preform polyurea thickener in various forms, such as noodle, extrudate, or paste forms with even small particle sizes with a significant decrease in the severity of process conditions, e.g., temperatures needed for grease conversion, while eliminating the need for subsequent milling.

In one embodiment, when a harder grease is desired, base oils can be used in amounts of up to 80%. When added in these amounts to a twin-screw extruder, a polyurea grease having a NLGI grade 4 and above is formed. To make a softer grease, base oils can be used in an amount of more than 80%. In doing so, the twin screw extruder yields polyurea grease having NLGI grade 2 and higher.

In one embodiment besides twin-screw extruder, alternative shear driven mixing device such rotor stator mixer, internal mixer such as Banbury mixer, extruder, or homogenizer, with the ordinary skill of the art, deems applicable to facilitate the shear thickening aspect in the use of polyurea powder.

In one embodiment the type of base oils used in making master batch can be paraffinic or naphthenic (Group I/II/III) or any type of synthetic base oils (Group IV and V) without limitation, or naphthenic oils, synthetic naphthenic oils such as alkyl benzene, diphenyl either, biphenyl, and alkylated naphthalene are preferred due to its inherent high stability and solvency resulting in higher grease yield (less thickener dosage).

Grease Conversions Via Fine Powder and Masterbatch

In one embodiment, the super fine polyurea thickener powder prepared according to the first embodiment (FIG. 1) is gelled in the presence of base oil, such as a hydrocarbon base oil, at a temperature of 100° C. to 180° C., such as 120-160° C., or even at range of 140° C. to 160° C. Gelling can be done in an ordinary grease kettle at an effective dosage from 10-25% based on the content of the urea containing composition from the first and second powder till thicken in less than 2-6 hours. Upon thickening, and typically within 30 minutes thereafter, the heat to the kettle is turned off. The remaining oil and additives such as antioxidant, extreme pressure or anti-wear, rust preventives, pour point depressant, tackifier, polymer, or other additives are added as it cools and milled to consistency to its final/desired grease. The present disclosure allows NLGI No. 2 polyurea grease to be made with urea thickener dosage from 6-12%.

In another embodiment, as shown and described in FIG. 3, a final grease is made. For example, a polyurea master batch made according to the second embodiment (as shown and described in FIG. 2) with appropriate mixing/grinding devices is used to make a final grease. The appropriate mixing/grinding devices contemplated herein include, but are not limited to, high speed mixer, air or mechanical mill, ordinary grease kettle, contactor, and homogenizer or any other appropriate wet dispersion devices.

As shown in FIG. 3, a polyurea grease with smooth fiber texture and excellent high temperature and structural stability can be made using a much simpler process than described in the prior art. For example, the grease can be made under thermal conditions ranging from ambient temperature to 140° C., such as up to 120° C., or even 100° C. In addition, the grease can be formed without the grinding and milling steps often required in current commercial processes.

INDUSTRIAL APPLICABILITY

The disclosed polyurea containing greases, the related embodiments thereof, including the polyurea containing powders and master batch made from the powder, and methods of making the same, may be used in applications that require stability under extreme lubrication conditions, such as high temperatures, high speeds and/or high loads. A non-metallic grease made according to principles of the present disclosure exhibit improved properties in the form of high temperature stability, low noise characteristic, good mechanical and oxidation properties, and high-shear stability. Accordingly, a non-metallic grease made according to principles of the present disclosure made be used for applications such as sealed-for-life bearings, ball bearing, electric motors applications, and the like.

The features and advantages of the present disclosure are more fully shown by the following examples which are provided for purposes of illustration and are not to be construed as limiting the invention in any way.

EXAMPLES

The following examples disclose methods of making polyurea containing dry powders, master batch compositions containing the dry powders, and greases made from the dry powders.

Example 1

In this example, a 1 to 1 mole mixture of tallow and cyclohexyl amine and isocyanate was co-fed without solvent or base oil through variable ratio pump into a ultrahigh pressure mixing chamber with chamber dimensions such as orifice size and chamber length sufficient enough to accommodate residence time ranging from greater than 0 seconds up to 3 seconds and a pressure of 3,000 psi. The resulting super-fine, dry powder had an averaged particle size (D50) of 50 micron without a trace of unreacted isocyanates. It was subsequently fed to a continuous sizing device yielding an averaged particle size of 10 micron.

Example 2

In this example, a 3 to 7 mole ratio of tallow and cyclohexyl amine and isocyanate were co-fed via ultrahigh pressure mixing chamber at a pressure of 3,000 psi according to example 1.

Examples 3 and 4

Tallow and cyclohexyl amine and isocyanate were co-fed by mole ratio via ultrahigh pressure mixing chamber at a pressure of 3,500 psi according to examples 1 and 2.

Examples 5, 6, 7, 8, 9, and 10

In these examples varying amine ratio and functionalities such as tallow and cyclohexyl amine (example 5 and example 6 with alkylated naphthalene ("AN23") base oil added), dicyclohexyl amine (example 7), ethanol amine (example 8), Jeffamine D (examples 9 and 10), at a pressure of 4,000 psi.

Grease Conversion

The first and second urea powders exemplified by all the above examples (1-10) gelled readily within 160° C./2 hours and the grease formation is complete within 4-6 hours of heating during which a smooth grease is formed with excellent grease consistency and workability and excellent structural and high temperature stability with high dropping point more than 280° C. (see Table 1). The second urea powder after sizing further improve the workability and consistency of the grease (reduced number of milling) and increase the yield of the thickener.

Comparative Examples A and B

Comparative Example A was made in a procedure given in example 2 with 15% of an alkylated naphthalene through a commercially available impingement device. Comparative Example B was made via a solvent (THF, tetrahydrofuran) process. In Comparative Example A the impingement device continually clogged during processing. Even after cleaning and clearing the clog, the device would continuously clog. In both comparative examples the resulting urea powders did not gel at 160° C. within two hours. Furthermore, upon extended heating, the grease formed had poor consistency, which required multiple milling steps.

TABLE 1

| | Examples | | | | | | | | | | | |
|---|---|---|---|---|---|---|---|---|---|---|---|---|
| | 1 | 2 | 3 | 4 | 5 | 6 | 7 | 8 | 9 | 10 | Comp. A | Comp. B |
| Mixing Chamber Design | Inv. | Inv. | Inv. | Inv. | Inv. | Inv. | Inv. | Inv. | Inv. | Inv. | Prior Art | Solvent Process |
| Pressure (psi) | 3000 | 3000 | 3500 | 3500 | 4000 | 4000 | 4000 | 4000 | 4000 | 4000 | 2000 | |
| Device Clogging | | | | | No clogging | | | | | | Clogged | |
| Oil/Solvent by wt % of the total RM feeds | 0% | 0% | 0% | 0% | 0% | AN23 15% | 0% | 0% | 0% | 0% | AN23 15% | THF 400% |
| MDI | 1 | 1 | 1 | 1 | 1 | 1 | 1 | 1 | 2 | 2 | 1 | 1 |
| Tallow Amine | 1 | 0.3 | 1 | 0.3 | 1 | 0.3 | 1 | 1 | | | 0.3 | 1 |
| Cyclohexylamine | 1 | 0.7 | 1 | 0.7 | 1 | 0.7 | 0.5 | 0.95 | 1 | 2 | 0.7 | 1 |
| Jeffamine D | | | | | | | | | 1.5 | 1 | | |
| Dicyclohexylamine, | | | | | | | 0.5 | | | | | |
| Ethanolamine | | | | | | | | 0.05 | | | | |
| Particle size analysis | | | | | | | | | | | | |
| D1 (D50) | 48 | 47 | 20 | 20 | 16 | | | | | | 77 | 41 |
| DD1 (D90-D50) | 47 | 61 | 32 | 32 | 32 | | | | | | 153 | 410 |
| DD2 (D90-D50) | 15 | | | 9 | 2.9 | | | | | | | |
| DD2 (D90-D50) | 15 | | | 9 | 2.9 | | | | | | | |
| Grease Conversion | | | | | | | | | | | | |
| Powder, sized | Yes | No | No | Yes | Yes | | | | | | No | No |
| 160° C./2 hr | Gelled | Gelled | Gelled | Gelled | Gelled | Gelled | Gelled | Gelled | Gelled | Gelled | Not gelled | Not gelled |
| Thickener % | 10% | 10% | 9% | 9% | 6% | | | | | | 12% | 12% |
| Milling, times | 1× | 3× | 1× | 1× | 1× | | | | | | 6× | 6× |
| Penetration (Pw) | 280 | 275 | 280 | 275 | 285 | | | | | | 300 | 280 |
| Dropping Point, C. | 290 | 285 | 290 | 290 | 295 | | | | | | 240 | 250 |

Example 13 and 14—Masterbatch Production

The first urea powder (example 2) and alkylated naphthalene (20 cSt@100C) were fed into a twin screw extruder in a 20/80 and 80/20 volume ratio respectively at 5 to 500 pounds per hour. The resulting polyurea masterbatch was in paste forms that can be further cut into pallets/extrudates (Example 13, see Table 2) and in thick grease form (Example 14). In the subsequent grease conversion, additional AN23 base oil was used to give a final 10% yield resulting in polyurea grease with reduced process time/temperature and even less milling and superior structural/mechanical stability.

TABLE 2

|  | EX. 13 | Ex. 14 |
|---|---|---|
| Powder % by volume | 80% | 20% |
| Masterbatch Form | Pallets | Noodle |
| Grease Conversion | | |
| Grease gelling temperature, ° C. | 140° C. | 60° C. |
| Thickener % | 10% | 10% |
| Milling | 2× | 1× |
| Penetration* | 280 | 285 |
| Delta P100,000 ** | <15 | 5 |
| Dropping Point (° C.) | 290 | 295 |

*Penetration: ASTM D217: $P_{W}$ 60
**Delta PW100,000: Delta $P_{W}$ (60 strokes-100,000 strokes)

Other embodiments of the invention will be apparent to those skilled in the art from consideration of the specification and practice of the invention disclosed herein. It is intended that the specification and examples be considered as exemplary only, with the true scope of the invention being indicated by the following claims.

What is claimed is:

1. A method of making a urea containing powder, comprising:
    injecting at least one liquid amine and at least one liquid isocyanate simultaneously into a mixing chamber, said mixture chamber comprising at least one high pressure impingement mixing device;
    mixing the at least one amine and the at least one isocyanate in the at least one high pressure impingement mixing device at a pressure of at least 2500 psi for a time sufficient to form a first urea containing powder, said time is less than 10 seconds, wherein the first urea containing powder has an average particle size (D50) represented as D1, and molecular weight distribution (D90-D50) represented as DD1;
    feeding the first urea containing powder into a sizing device to form a second urea containing powder with an average particle size (D50) represented as D2, wherein D2 is less than D1, and molecular weight distribution (D90-D50) represented as DD2, wherein DD2 is less than DD1,
    wherein the second urea containing powder composition has a stoichiometric mole ratio of isocyanates and amine functionalities.

2. The method of claim 1, wherein D1 ranges from 0.1 micron to 100 micron and DD1 ranges from 1 micron to 100 micron.

3. The method of claim 1, wherein D2 ranges from 0.1 micron to 30 micron and DD2 ranges from 1 micron to 50 micron.

4. The method of claim 1, wherein said at least one amine and at least one isocyanate are mixed in the chamber at a pressure ranging from 2500 psi to 7000 psi.

5. The method of claim 1, wherein said mixing and feeding are performed continuously in the absence of solvents and base oils to produce a di-urea or polyurea containing dry powder.

6. The method of claim 1, where said mixing time is less than 5 seconds.

7. The method of claim 1, wherein the first urea powder is made in the presence of at least one solvent or base oil that is added either with the isocyanate, the amine or both in an amount that does not change the particle size characteristics of the powder.

8. The method of claim 7, where solvent is present in amount up to 50% by weight of the isocyanate, the amine or both and is stripped/removed after the first urea powder is made.

9. The method of claim 7, where the base oil is present in amount of up to 30% by weight of the isocyanate, the amine or both.

10. The method of claim 1, wherein the amine functionalities are chosen from aliphatic, cyclic, aromatic amines, primary or secondary, linear or branched, mono or diamine, alcohol or alkoxy containing amines, other amine derivatives, and mixtures thereof.

11. The method of claim 1, wherein the amine is chosen from lauryl, stearyl, or tallow amines, cyclohexyl and dicyclohexyl amine, benzylamine, aniline, diamine, mono or polyetheramine and mixtures thereof.

12. The method of claim 1, wherein the isocyanate is chosen from methylene diphenylene diisocyanate, and monomeric or polymeric toluene di-isocyanate.

13. The method of claim 1, wherein the sizing device is selected from an air or mechanical impact mill or combinations thereof, wherein the air impact mill comprises an air classification device or an air jet, and the mechanical impact mill is selected from a pin mill, ball mill, hammer mill or screen mill.

14. The method of claim 1, further comprising at least one shear thickening step to form a thickened polyurea containing master batch, the at least one shear thickening step comprising a continuous shear driven process that includes mixing dry powder comprising the urea containing master batch with at least one base oil, wherein the dry powder and base oil are mixed in a weight ratio ranging from 5/95 to 95/5.

15. The method of claim 14, wherein the thickened polyurea containing master batch is mixed using a device chosen from a twin screw extruder, a rotor stator mixer, an internal mixer, or homogenizer.

16. The method of claim 15, wherein the thickened polyurea containing master batch is mixed with a device that will allow it to be extruded in the form of a noodle, paste, or extrudate.

17. The method of claim 16, wherein the noodle, paste, or extrudate include urea containing master batch having an average particle size (D50) ranging from 0.1-50 micron.

18. The method of claim 14, wherein the base oil used in making master batch is chosen from paraffinic oils, naphthenic oils, hydrocracked oil (Group I/II/III), alkylbenzene, Group IV and V synthetic oils or combinations thereof.

19. The method of claim 15, wherein when the master batch is produced via twin screw extruder, at least one of D1, DD1, D2, DD2 is reduced.

20. The method of claim 1, further comprising forming a polyurea grease by gelling under heat the second urea containing powder in the presence of an oil to form a gelled product, and milling the gelled product to produce a polyurea grease with a smooth consistency and texture and dropping point at least 250° C.

21. The method of claim 20, the gelling under heat is performed in an opened or sealed grease kettle, or any reactor vessels suitable for oil dispersion.

22. The method of claim 20, where the gelling temperature ranges from 100° C. to 180° C.

23. The method of claim 20, wherein milling is performed using a three-roll colloid mill, or homogenizer.

24. The method of claim 14, further comprising forming a polyurea grease by dispersing the thickened polyurea containing master batch in the presence of an oil using one or more dispersing vessels to form a dispersion, and milling the dispersion to produce a polyurea grease with smooth consistency and dropping point at least 250° C.

25. The method of claim 24, wherein the dispersing vessel is selected from a high-speed mixer, pin mill, ball mill, open kettle, or any vessel suitable for oil dispersion.

26. The method of claim 24, wherein dispersing is performed at a temperature ranging from ambient to 160° C.

27. The method of claim 16, wherein the noodle, paste, or extrudate include urea containing master batch having an average particle size (D50) from 0.1-5 micron.

28. The method of claim 27, further compromising a polyurea grease composition made with master batch that is suitable for high speed and low noise grease applications.

29. The method of claim 14, further comprising a continuous process for forming a polyurea grease, said continuous process comprises feeding said base oil into the continuous shear driven process at rate more than 5,000 pounds per hour.

* * * * *